United States Patent [19]

Yamazaki et al.

[11] Patent Number: 4,706,211
[45] Date of Patent: Nov. 10, 1987

[54] DIGITAL MULTIPLYING CIRCUIT

[75] Inventors: Takao Yamazaki; Seiichiro Iwase, both of Kanagawa, Japan

[73] Assignee: Sony Corporation, Tokyo, Japan

[21] Appl. No.: 651,155

[22] Filed: Sep. 17, 1984

[30] Foreign Application Priority Data

Sep. 22, 1983 [JP] Japan ................................ 58-175881

[51] Int. Cl.⁴ .............................................. G06F 7/52
[52] U.S. Cl. ..................................... 364/760; 364/757
[58] Field of Search ............... 364/754, 757, 759, 760, 364/758, 784

[56] References Cited

U.S. PATENT DOCUMENTS 3,515,344 6/1970 Goldschmidt et al. ............. 364/758
4,616,330 10/1986 Betz ..................................... 364/758

Primary Examiner—Gary V. Harkcom
Assistant Examiner—Long Thanh Nguyen
Attorney, Agent, or Firm—Lewis H. Eslinger; Alvin Sinderbrand

[57] ABSTRACT

A digital multiplying circuit in a parallel multiplying circuit which can multiply an input which changes at a high data rate by the pipeline processing. A multiplicand is inputted to this circuit. Partial product signal generating circuits of the number corresponding to only the number of partial product signals which are needed are provided. The partial product signal generating circuits produce the partial product signals in accordance with the state of predetermined bits of a multiplier. Each partial product signal is added, thereby obtaining a multiplication output of the multiplicand. The pipeline processing is performed in the adding operation of each partial product signal. The multiplier and multiplicand are delayed. The predetermined partial product signal generating circuits are arranged immediately before the adders which need the partial product signals, thereby obtaining the partial product. With this digital multiplying circuit, the total number of bits of registers is reduced and the circuit scale is made small.

7 Claims, 10 Drawing Figures

DIGITAL MULTIPLYING CIRCUIT

BACKGROUND OF THE INVENTION

1. Field of the Invention

The present invention relates to a digital multiplying circuit which is suitable for use in a parallel multiplying circuit using, for example, a Booth's algorithm.

2. Description of the Prior Art

FIG. 1 shows an example of a parallel multiplying circuit using a conventional second Booth's algorithm to which the present invention can be applied. The description will now be made with respect to the case where a multiplicand X consists of ten bits of $(x_9, x_8, \ldots, x_0)$ which is a 2's complement code and a multiplier Y consists of ten bits of $(y_9, y_8, \ldots, y_0)$ which is a 2's complement code and where the product (X·Y) of both of the multiplicand X and multiplier Y is obtained.

In FIG. 1, a reference numeral 1 denotes a register in which the multiplicand X is stored and 2 indicates a register in which the multiplier Y is stored. The multiplicand X is supplied to selectors 3, 4, 5, 6, and 7. The lower significant two bits $y_0$ and $y_l$ of the multiplier Y and 0 are supplied to an encoder 8. The three bits $y_1$, $y_2$ and $y_3$ of the multiplier Y are supplied to an encoder 9. The three bits $y_3$, $y_4$ and $y_5$ are supplied to an encoder 10. The three bits $y_5$, $y_6$ and $y_7$ are supplied to an encoder 11. The three bits $y_7$, $y_8$ and $y_9$ are supplied to an encoder 12. Each of the encoders 8 to 12 generates a 3-bit output. The selectors 3 to 7 are respectively controlled by these outputs, so that partial products PA, PB, PC, PD, and PE each of which consists of eleven bits are formed.

When it is now assumed that the inputs to the encoders 8 to 12 are $y_{i+2}$, $y_{i+1}$ and $y_i$ (with $y_{i+2}=y_1$, $y_{i+1}=y_0$ and $y_i=0$ for the special case of encoder 8) and their outputs are e and the partial products which are obtained as the outputs of the selectors 3 to 7 are PP, these partial products PP are as shown below in the second Booth's algorithm.

| $y_{i+2}$ | $y_{i+1}$ | $y_i$ | e  | : | PP  |
|-----------|-----------|-------|----|---|-----|
| 0         | 0         | 0     | 0  | : | 0   |
| 0         | 0         | 1     | +1 | : | +X  |
| 0         | 1         | 0     | +1 | : | +X  |
| 0         | 1         | 1     | +2 | : | +2X |
| 1         | 0         | 0     | −2 | : | −2X |
| 1         | 0         | 1     | −1 | : | −X  |
| 1         | 1         | 0     | −1 | : | −X  |
| 1         | 1         | 1     | 0  | : | 0   |

On the other hand, in an alternative embodiment (not illustrated) having the constitution such that selectors 3 to 7 perform the arithmetic operations of 1's complement and thereby to obtain negative values, one bit is added to carry out the correction for performing the negative expression of 2's complement arithmetic operations, so that the number of bits of partial product becomes twelve.

The partial products PA and PB which are respectively outputted from the selectors 3 and 4 are supplied to an adder 13. The output of the adder 13 and the partial product PC outputted from the selector 5 are supplied to an adder 14. The output of the adder 14 and the partial product PD outputted from the selector 6 are supplied to an adder 15. The output of the adder 15 and the partial product PE outputted from the selector 7 are supplied to an adder 16. In the addition by the adders 13 to 16, a predetermined weight is imparted to each partial product from the selectors 3 to 7 and is added. Namely, the partial product PB is shifted to the left by two bits and is added to the partial product PA. Similarly, the partial products PC, PD and PE are respectively shifted to the left by two bits and are added to the addition outputs of the adders 13, 14 and 15 at the front stage, respectively. This shifting operation to the left by two bits upon addition can be executed only by shifting the relative bit locations of the two addition inputs. The output of the adder 16 becomes the product (X·Y) and it is stored in a register 17.

In the parallel multiplying circuit shown in FIG. 1, the selectors 3 to 7 and the four-stage adders 13 to 16 are interposed between the registers 1 and 17; while the encoders 8 to 12 and the selectors 3 to 7 and the four-stage adders 13 to 16 are interposed between the registers 2 and 17. Therefore, the delay time in the multiplication becomes large and a high-speed operation cannot be expected in standard devices such as CMOS, TTL, etc. As a result, there is a problem such that it is impossible to multiply a signal having a high data rate such as, for instance, a digital color video signal.

As a method of solving such a problem, a method whereby the pipeline processing is carried out is considered. Namely, as shown in FIG. 2, registers 18 and 19, registers 20 and 21, registers 22 and 23, and registers 24 and 25 are respectively interposed on the two input sides of each of the adders 13, 14, 15, and 16. Further, in order to match the timings, a register 27 is interposed between the selector 5 and the register 21; registers 28 and 29 are interposed between the selector 6 and the register 23; and registers 30, 31 and 32 are interposed between the selector 7 and the register 25. With such an arrangement for performing the pipeline processing, it is possible to multiply the input (at least one of the multiplicand X and multiplier Y) which changes at every clock having the highest frequency at which the selectors 3 to 7, encoders 8 to 12 and adders 13 to 16 whose input and output sides are sandwiched by the registers can operate. However, this arrangement causes problems such that the number of registers becomes large and the circuit scale becomes large.

In addition, FIG. 3 shows another arrangement of the case where the parallel multiplying circuit of FIG. 1 was constituted such that the pipeline processing can be performed. Different from the circuit arrangement shown in FIG. 1, this circuit is constituted so as to execute the pipeline processing for every two stages of the adders. In other words, the adders 13 and 14 are combined as a set and the registers 18, 19 and 27 are provided on its input side. Also, the adders 15 and 16 are combined as a set and the registers 22, 23 and 32 are provided on its input side.

Further, as shown in FIG. 4, as a circuit arrangement for adding the partial products, the following arrangement is also possible. Namely, the partial products PA and PB which are outputted from the selectors 3 and 4 are added by an adder 41. This addition output and the partial product PC outputted from the selector 5 are added by an adder 42. The partial products PD and PE outputted from the selectors 6 and 7 are added by an adder 43. The outputs of the adders 42 and 43 are added by an adder 44. Such an arrangement whereby the adders 41 to 44 are connected like a tree as mentioned above can be constituted so as to perform the pipeline processing, as shown in FIG. 5, by respectively interposing registers 45, 46, 47, 48, 49, 50, 51, and 52 on the input and output sides of the adders 41 to 44 and by interposing registers 54, 55 and 56 for matching the timings.

The parallel multiplying circuits with the arrangements shown in FIGS. 3 and 5 have a drawback such that the number of registers becomes large similarly to the arrangement of FIG. 2.

OBJECTS AND SUMMARY OF THE INVENTION

It is an object of the present invention to provide a digital multiplying circuit in a parallel multiplying circuit which can multiply the input which changes at a high data rate by the pipeline processing, wherein the total number of bits of registers is reduced and the circuit scale is also made small.

According to the invention, a digital multiplying circuit is constituted in the manner such that: a multiplicand is inputted; partial product signal generating circuits of the number corresponding to only the number of partial products which are needed are provided; the partial product signal generating circuits generate the partial product signals in accordance with the state of predetermined bits of a multiplier; each partial product signal is added; and thereby a multiplication output of the multiplicand is obtained. Features of the present invention are that the pipeline processing is performed in the adding operation of each partial product signal and that the multiplier and multiplicand are delayed and the predetermined partial product signal generating circuits are arranged immediately before the adders which require the partial product signals, thereby obtaining the partial product signals.

The above and other objects, features and advantages of the present invention will be more apparent from the following detailed description in conjunction with the accompanying drawings.

DESCRIPTION OF PREFERRED EMBODIMENTS

Figure 1:
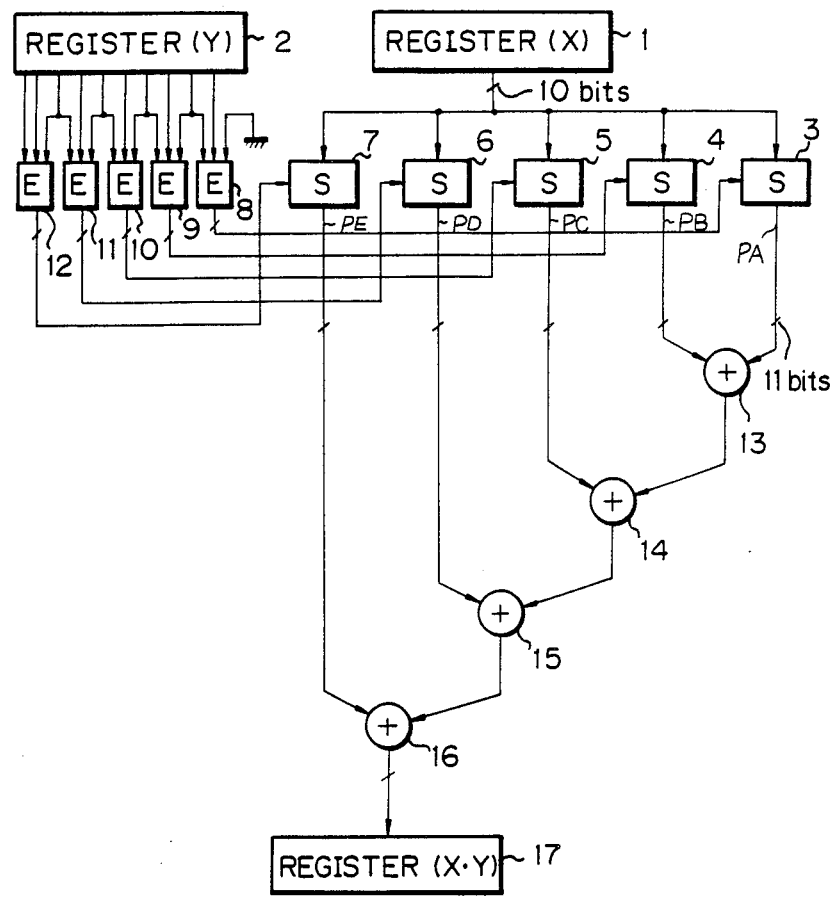
FIGS. 1 and 2 are a block diagram showing an example of a conventional parallel multiplying circuit to which the present invention can be applied and a block diagram showing an example of a parallel multiplying circuit which can perform the pipeline processing.
Figure 2:
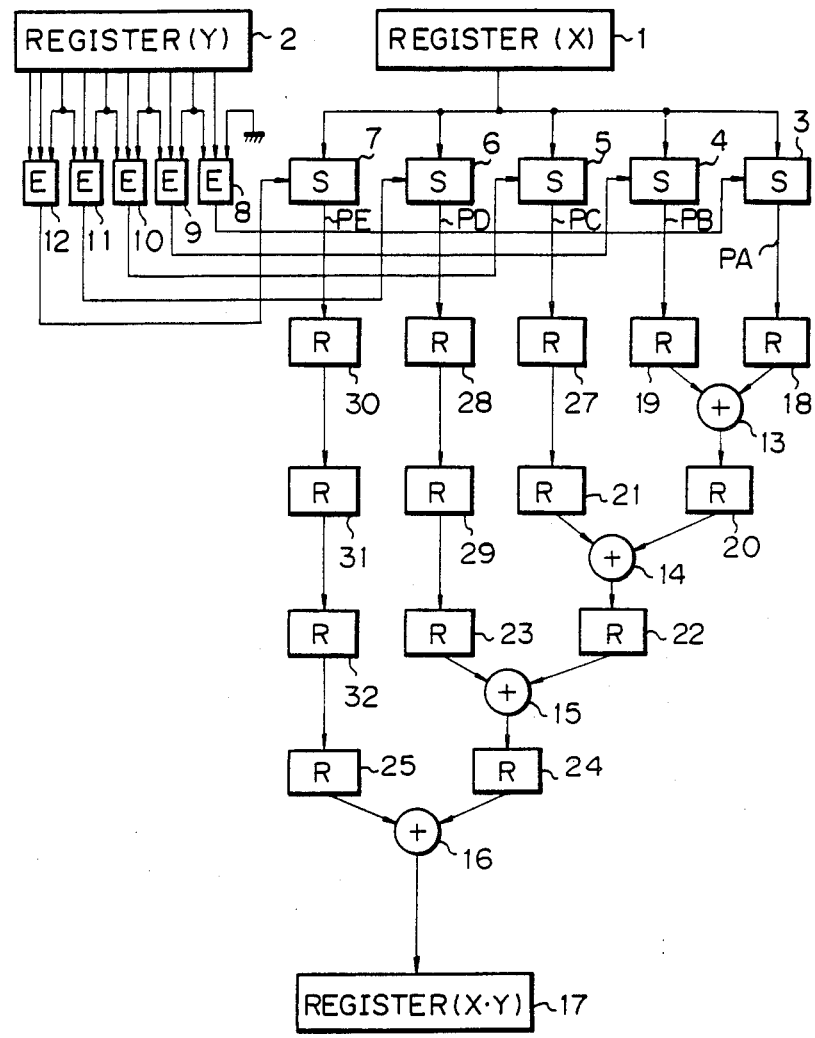
Figure 6:
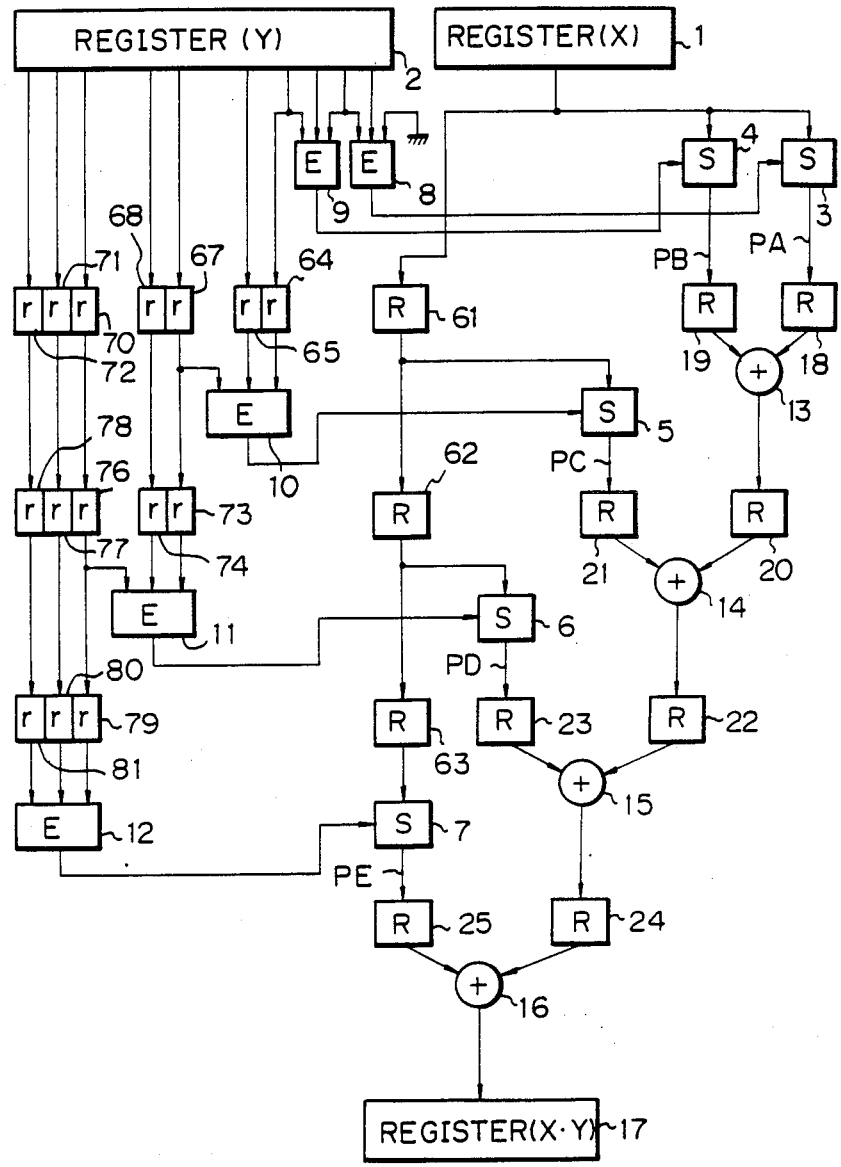
FIG. 6 is a block diagram showing an embodiment of the invention.

An embodiment of the present invention shown in FIG. 6 relates to a digital multiplying circuit of which the invention was applied to the parallel multiplying circuit shown in FIG. 2.

The multiplicand X of the 2's complement code consisting of ten bits, for example, stored in the register 1 is supplied to the selectors 3 and 4, and at the same time it is supplied to a register 61. Registers 62 and 63 are connected in series to the register 61. The registers 18 and 19 are connected to the input side of the adder 13 for adding the partial products PA and PB. Similarly, the registers 20, 21, 22, 23, 24, and 25 are interposed on the respective input side of the adders 14, 15 and 16 for performing the additions of the partial products. The output of the adder 16 is supplied to the register 17. In this way, the adders 13 to 16 are constituted such that they are sandwiched by the registers, respectively.

Each register in this embodiment of the invention holds the data for one clock interval of the varying frequency of at least one of the multiplicand X and multiplier Y. The multiplicand X is supplied from the register 61 to the selector 5. The partial product PC which is derived as the output of the selector 5 is supplied to the adder 14 through the register 21. The multiplicand X from the register 62 is supplied to the selector 6. The partial product PD which is obtained as the output of the selector 6 is supplied to the adder 15 through the register 23. Further the multiplicand X from the register 63 is supplied to the selector 7. The partial product PE from the selector 7 is supplied to the adder 16 through the register 25. Thus, the selectors 3 to 7 are constituted such that they are sandwiched by the registers, respectively.

The multiplicand X which was sequentially delayed by the registers 61, 62 and 63 as well as the register 1 is supplied to the selectors 3 to 7; therefore, the signals to control these selectors are also similarly delayed. The lower significant two bits $y_0$ and $y_1$ of the multiplier Y and 0 are supplied from the register 2 to the encoder 8. The three bits $y_1$, $y_2$ and $y_3$ of the multiplier are supplied from the register 2 to the encoder 9. The selectors 3 and 4 are controlled by the outputs of the encoders 8 and 9. The three bits $y_3$, $y_4$ and $y_5$ of the multiplier Y derived through registers 64, 65 and 67 each of which consists of one bit are supplied to the encoder 10. The selector 5 is controlled by the output of the encoder 10. The bit $y_5$ obtained through registers 67 and 73, the bit $y_6$ obtained through registers 68 and 74, and the bit $y_7$ obtained through registers 70 and 76 are supplied to the encoder 11. The selector 6 is controlled by the output of the encoder 11. Further, the bit $y_7$ obtained through registers 70, 76 and 79, the bit $y_8$ obtained through registers 71, 77 and 80, and the bit $y_9$ obtained through registers 72, 78 and 81 are supplied to the encoder 12. The selector 7 is controlled by the output of the encoder 12. The encoders 8 to 12 generate the outputs in accordance with the second Booth's algorithm. The predetermined partial products PA, PB, PC, PD, and PE are produced as the outputs of the selectors 3 to 7.

It will be described with reference to FIGS. 7 and 8 that the above-mentioned embodiment performs the arithmetic operation which is equal to that by the parallel multiplying circuit shown in FIG. 2.

In the arrangement of FIG. 2, an attention is now paid to the selector 7, encoder 12, and registers 30, 31 and 32 for producing the partial product PE. First, the partial product PE is produced and this partial product PE is delayed through the registers 30, 31 and 32 and is supplied to the register 25 before the adder 16. As shown in FIG. 7, this is equivalent to that the multiplicand X is delayed by three clock interval by the registers 61, 62 and 63 and is supplied to the selector 7 and that the three bits y9, y8 and y7 of the multiplier Y necessary to form the partial product PE are delayed by three clock interval by the registers 70, 71, 72, 76, 77, 78, 79, 80, and 81 and are supplied to the encoder 12.

Figure 7:
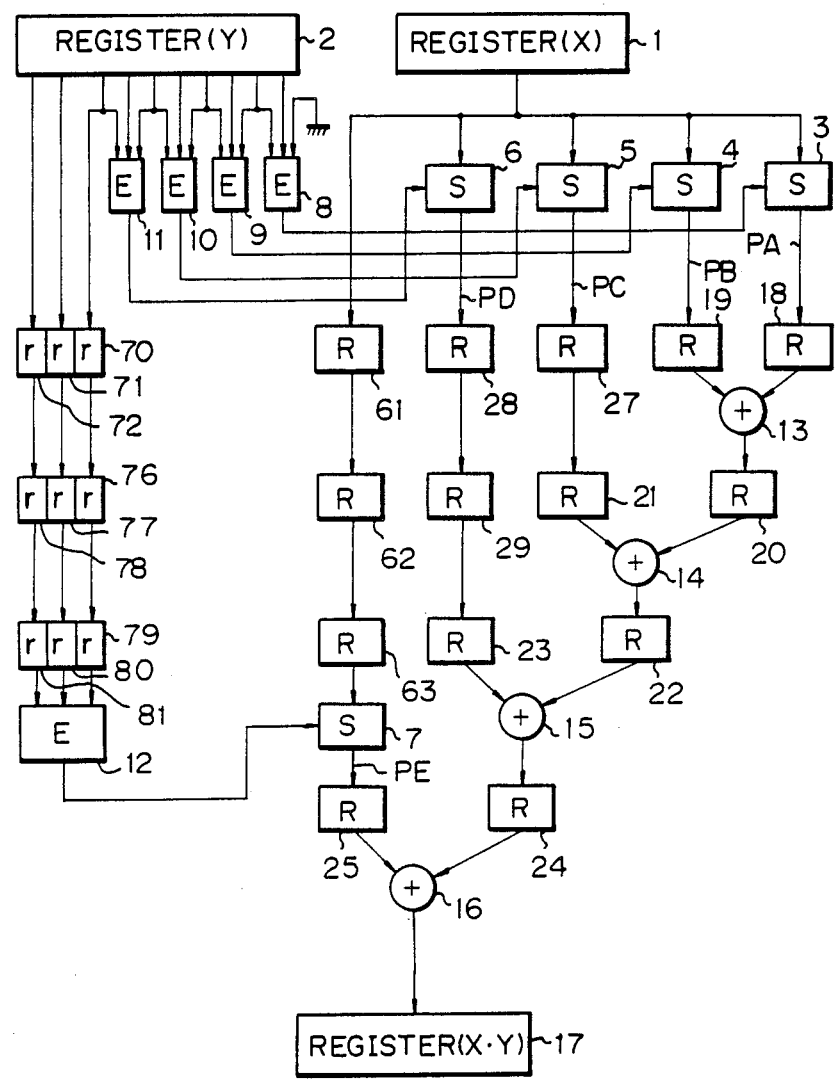
FIGS. 7 and 8 are block diagrams which are used for explaining the embodiment of the invention.
Figure 8:
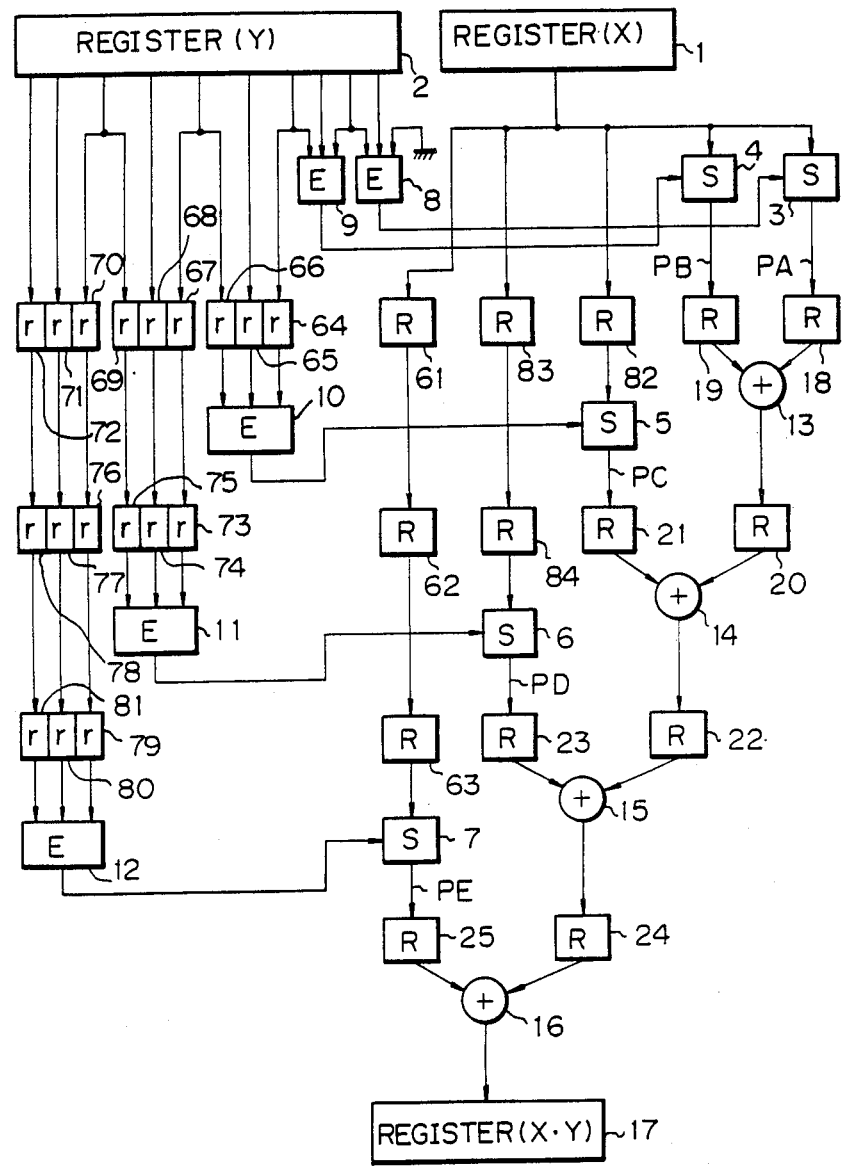

Further, in FIG. 7, by replacing the sections for producing the partial products PC and PD in the similar manner as above, the circuit arrangement shown in FIG. 8 is obtained. In more detail, with respect to the partial product PC, the multiplicand X is delayed by one clock interval by a register 82 and is supplied to the selector 5. The bits y3, y4 and y5 which were delayed by one clock interval by the registers 64, 65 and 66 are supplied to the encoder 10. The selector 5 is controlled by the output of the encoder 10. With regard to the partial product PD, the multiplicand X is delayed by two clock interval by registers 83 and 84 and is supplied to the selector 6. The bits y5, y6 and y7 which were delayed by two clock interval by the registers 67, 68, 69, 73, 74, and 75 are supplied to the encoder 11. The selector 6 is controlled by the output of the encoder 11.

The arrangement shown in FIG. 8 which is equivalent to the arrangement of FIG. 2 is obtained by the above-mentioned replacement. In FIG. 8, since the registers 61, 82 and 83 together delay the multiplicand X by one clock interval, while the registers 62 and 84 delay the respective outputs of the registers 61 and 83 by one clock interval. In addition, the registers 66 and 67 together delay the bit y5 of the multiplier Y by one clock interval. The registers 69 and 70 together delay the bit y7 of the multiplier Y by one clock interval. The registers 75 and 76 together delay the outputs of the registers 69 and 70 by one clock interval. Among these registers having the overlapped function, each one register remains and the others can be omitted. Namely, the registers 82 and 83 are omitted, the register 84 is omitted, the registers 66 and 69 are omitted, and the register 75 is omitted, so that the arrangement of one embodiment of the invention shown in FIG. 6 is derived.

The parallel multiplying circuit shown in FIG. 2 and the digital multiplying circuit shown in FIG. 6 will now be compared with regard to the circuit scale. Between both circuits, the registers 1, 2 and 17 in which the multiplicand X, multiplier Y and product (X·Y) are respectively stored, the selectors 3 to 7, the encoders 8 to 12, the adders 13 to 16, and the registers 18 to 26 disposed before and behind the adders 13 to 16 are the common component parts. Therefore, the comparison may be performed with respect to the other registers than the above parts.

As an example, in the case where the multiplicand X and multiplier Y respectively consist of ten bits and the partial products PA to PE respectively consist of twelve bits, the total number of bits of registers in the parallel multiplying circuit of FIG. 2 becomes 72 bits (i.e., 12 bits times six). On the other hand, the total number of bits of registers in the embodiment shown in FIG. 6 becomes 45 bits (i.e., 10 bits×3+1 bit ×15), so that the registers corresponding to 27 bits can be saved.

Generalization is made on the assumption that the multiplicand X consists of m bits and the multiplier Y consists of m bits and the number of partial product is l. Where, $$\begin{bmatrix} l = \frac{m}{2} & (m: \text{even number}) \\ l = \frac{m-1}{2} & (m: \text{odd number}) \end{bmatrix}$$

In the arrangement shown in FIG. 2, the register 27 of one stage, the registers 28 and 29 of two stages, . . . , the registers of (l−2) stages are sequentially needed with respect to the partial products from the partial product PC produced by the selector 5 to the partial products PD, PE, . . . Since each of these registers consists of (m+2) bits, the total number of necessary registers becomes $$\left[ \sum_{i=3}^{l} (i - 2) \right] \times (m + 2) \text{bits} = \tfrac{1}{2}(l - 2)(l - 1)(m + 2) \text{bits} \quad 1$$

On the other hand, in the arrangement of the embodiment of the invention shown in FIG. 6, the registers 61, 62, . . . each having a width of m bits of (l−2) stages are needed. At the same time, there are the registers of (l−2) stages each having three bits of the multiplier Y which are inputted to the encoder 12 of the highest order. Also, there are the registers of (l−3) stages each having two bits of the multiplier Y which are inputted to the other encoders 11, 10, . . . Thus, the total number of necessary registers becomes $$m(l - 2) + \left[ \sum_{i=3}^{l-1} (i - 2) \right] \times 2 \text{ bits} + (l - 3) \times 3 \text{ bits} = \quad 2$$

$$m(l - 2) + \tfrac{1}{2}(l - 3)(l - 2) \times 2 + (l - 3) \times 3 =$$

$$(l - 2)(l + m) \text{bits}$$

By substituting 8 bits, 10 bits, 12 bits, 16 bits, and 32 bits, respectively, as the bit width m for the above general expression, the following table is derived with regard to the number of bits which are needed for the conventional parallel multiplying circuit shown in FIG. 2 and for the arrangement of the foregoing embodiment of the present invention shown in FIG. 6.

|  | m = 8 | m = 10 | m = 12 | m = 16 | m = 32 |
| --- | --- | --- | --- | --- | --- |
| Arrangement of FIG. 2 | 30 | 72 | 140 | 378 | 3570 |
| Arrangement of FIG. 6 | 24 | 45 | 72 | 144 | 672 |
| Number of registers saved | 6 | 27 | 68 | 234 | 2898 |

As will be obvious from this table, this invention has the effect of saving a more proportional number of bits as the bit width m is increased.

Figure 3:
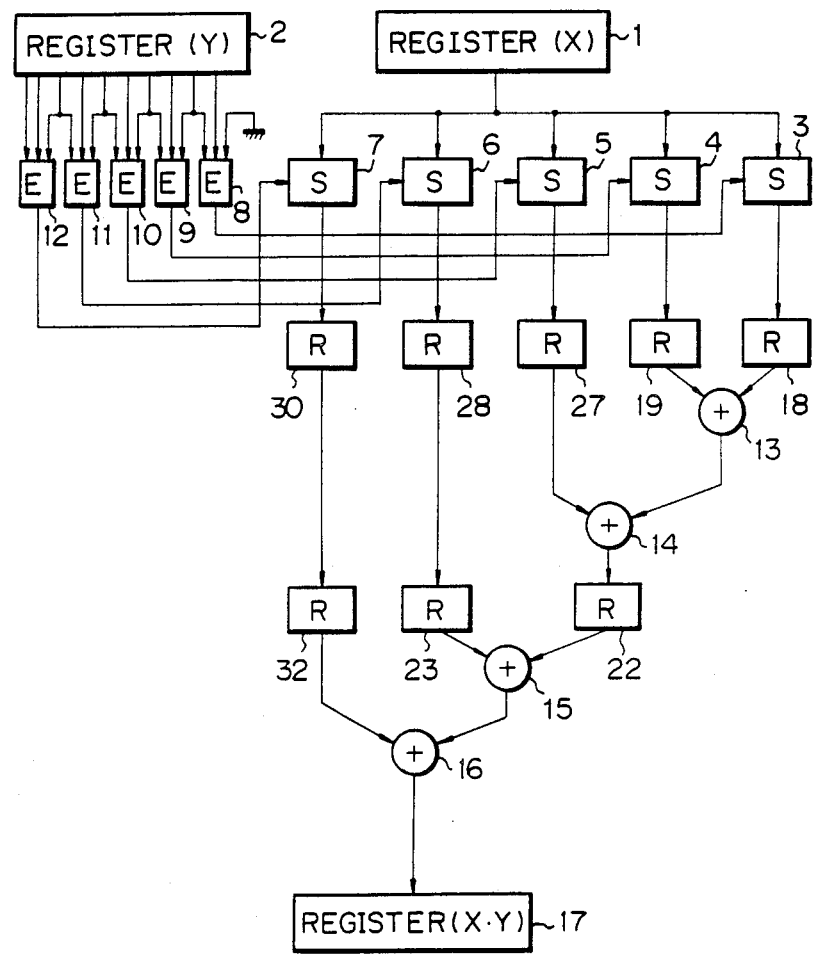
FIG. 3 is a block diagram showing another example of a parallel multiplying circuit to which the invention can be applied.
Figure 4:
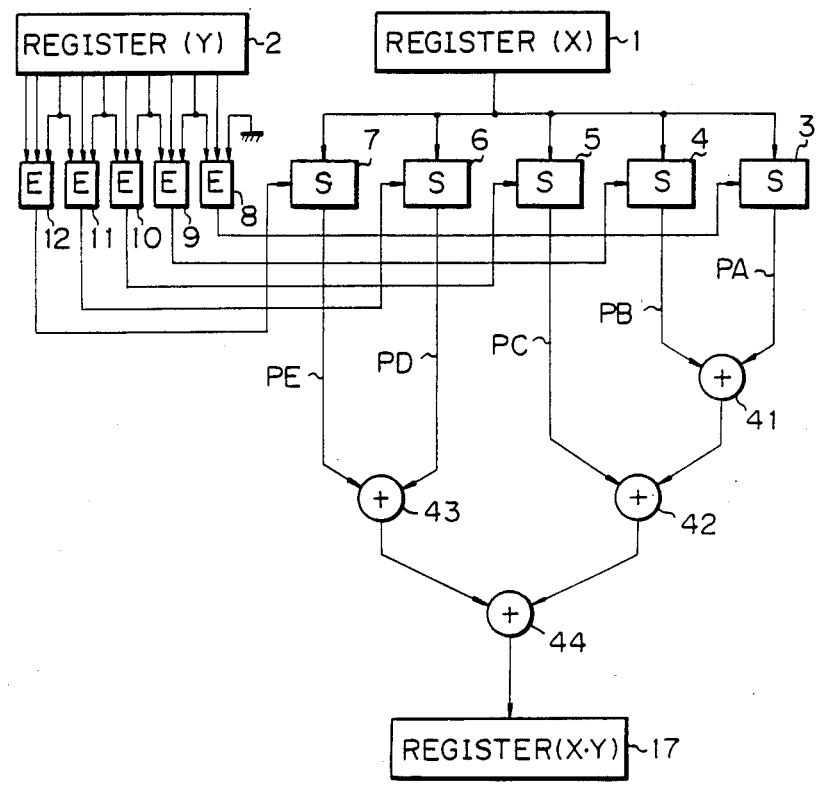
FIGS. 4 and 5 are a block diagram showing further another example of a conventional parallel multiplying circuit to which the invention can be applied and a block diagram showing further another example of a parallel multiplying circuit which can perform the pipeline processing.
Figure 9:
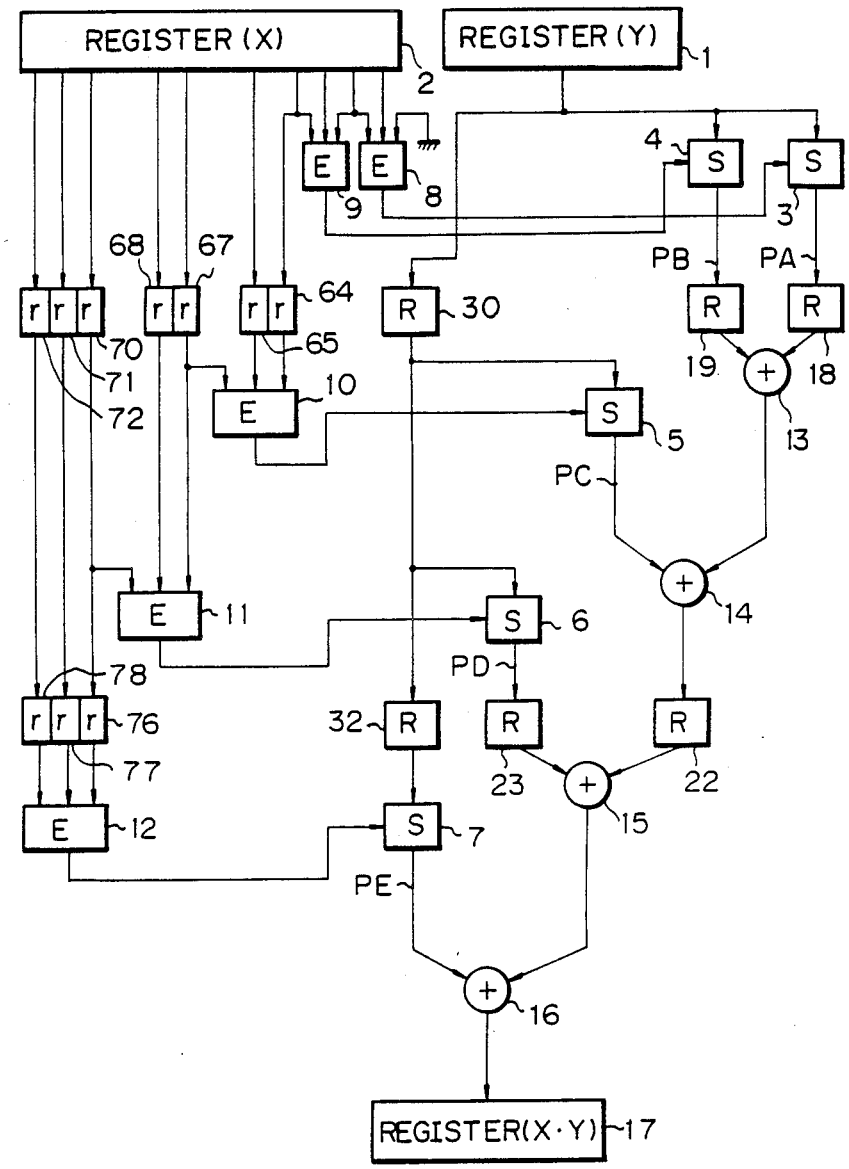
FIG. 9 is a block diagram showing another embodiment of the invention.

FIG. 9 shows an arrangement of another embodiment of the invention. This embodiment relates to a digital multiplying circuit of which the invention was applied to the parallel multiplying circuit which can perform the pipeline processing for every two stages of adders as shown in FIG. 3. A main feature of this digital multiplying circuit is that the selectors 3, 4, 5, 6, and 7 for respectively producing the partial products PA, PB, PC, PD, and PE are arranged immediately before the adders 13, 14, 15, and 16.

Figure 5:
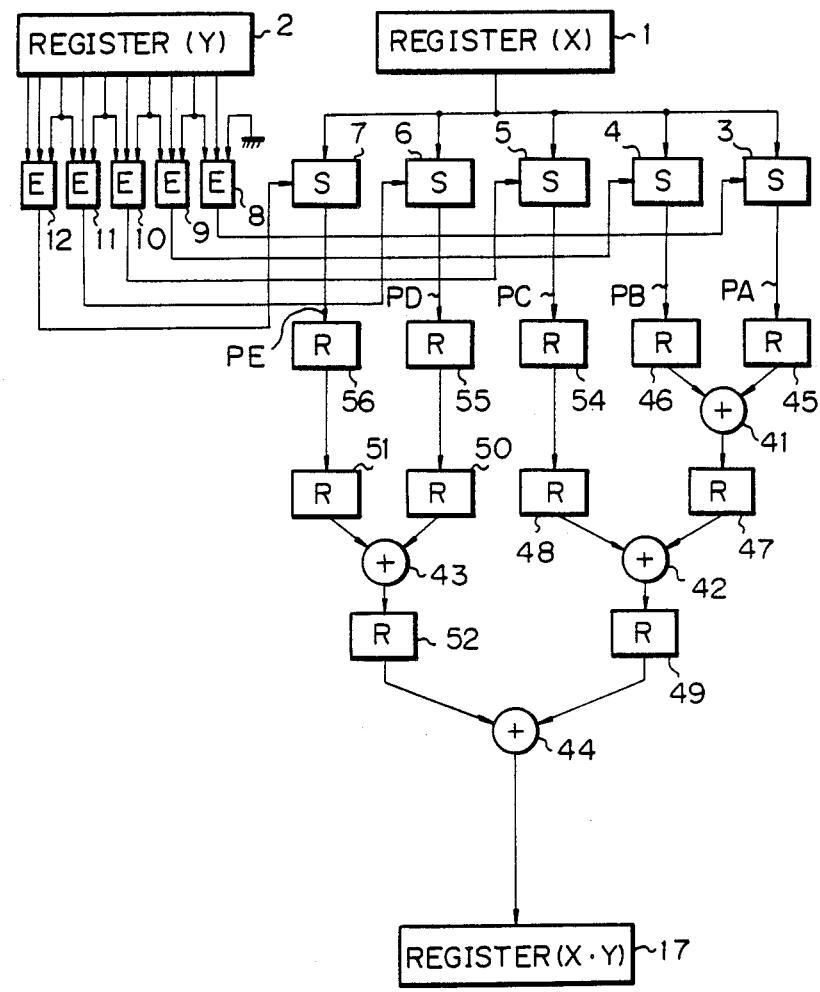
Figure 10:
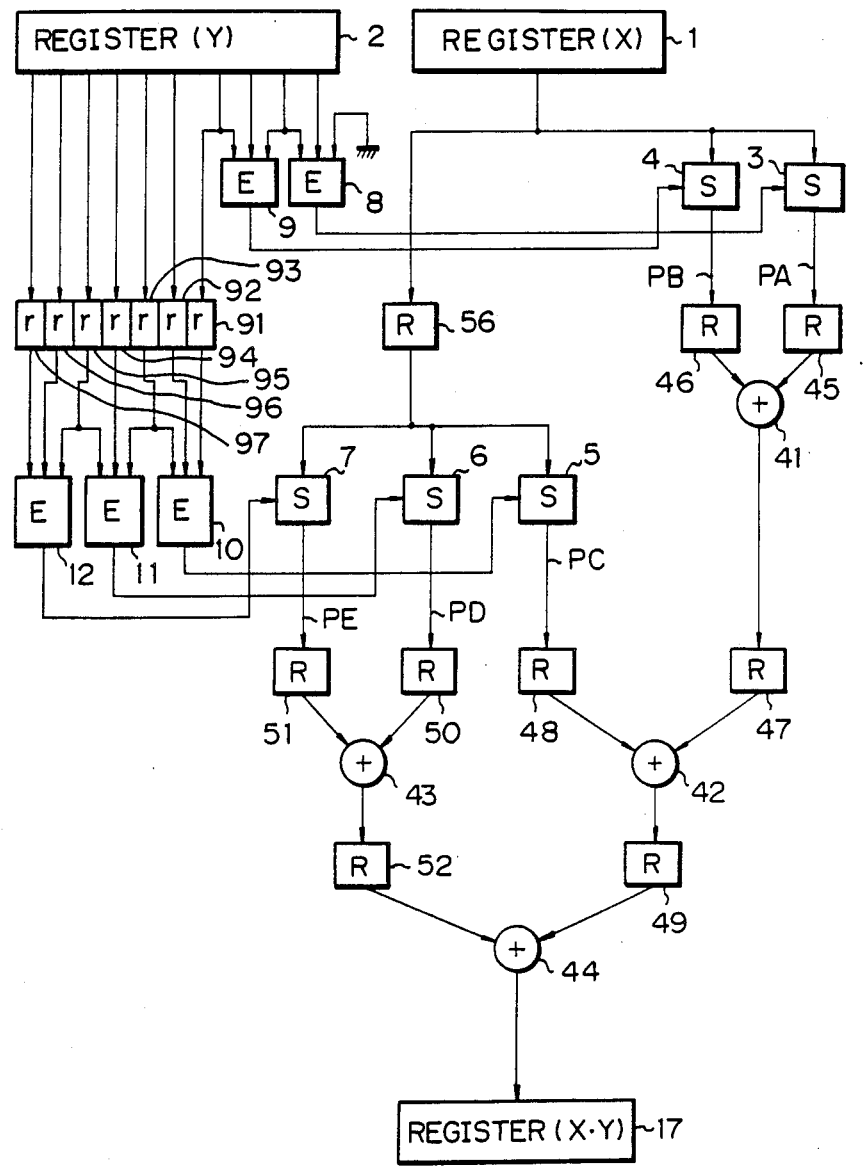
FIG. 10 is a block diagram showing further another embodiment of the invention.

FIG. 10 shows further another embodiment of the invention. This embodiment relates to a digital multiplying circuit of which the invention was applied to the circuit arrangement for adding the partial products like a tree as shown in FIG. 5. Namely, a feature of this digital multiplying circuit is that: the registers 54, 55 and 56 in FIG. 5 are collected as the one register 56; the multiplicand X from the register 56 is supplied to the selectors 5, 6 and 7; and the necessary bits in the multiplier Y are supplied through registers 91, 92, 93, 94, 95, 96, and 97 each consisting of one bit to the encoders 10, 11 and 12 for cohtrolling the selectors 5, 6 and 7.

With such other embodiments as mentioned above, the number of registers can be also saved.

In addition, the invention is not limited to a parallel multiplying circuit using the second Booth's algorithm, but can be also applied to a parallel multiplying circuit using the first Booth's algorithm and to a parallel multiplying circuit which does not use a Booth's algorithm.

Although the present invention has been shown and described with respect to preferred embodiments, various changes and modifications which are obvious to a person skilled in the art to which the invention pertains are deemed to lie within the spirit and scope of the invention.

According to the present invention, in a parallel multiplying circuit which can perform the pipeline processing and can carrY out the operation by a high speed clock, it is possible to realize a digital multiplying circuit in which the number of bits of registers is remarkably reduced compared to a conventional arrangement and the circuit scale is small.

What is claimed is:

1. A digital multiplying circuit for multiplying first and second digital signals comrpising:
   a plurality of partial product signal generating circuits for generating respective outputs, each of said circuits being supplied with said first digital signal;
   a plurality of control signal generators for generating control signals which are supplied to corresponding ones of said partial product signal generating circuits, each of said generators being supplied with selected bits of said second digital signal as a respective first input signal;
   adding means receiving the outputs of said partial product signal generating circuits for adding the same to generate a product of said first and second digital signals, said adding means having a plurality of adders for adding two second input signals, each of said second input signals for a respective adder being either one of said outputs of said partial product signal generating circuits or an output of another of said adders;
   first delay means for selectively delaying said first digital signal prior to its being supplied to selected ones of said partial product signal generating circuits;
   second delay means for delaying said second input signals prior to their being supplied to respective adders of said adding means; and
   third delay means for delaying the first input signals supplied to selected ones of said control signal generators so that the delay imparted by said first delay means to the first digital signal thereafter supplied to a respective partial product signal generating circuit is equal to the delay imparted by said third delay means to the first input signal supplied to the corresponding control signal generator whose output is supplied to said respective partial product signal generating circuit.

2. A digital multiplying circuit according to claim 1, wherein said first and second digital signals are 2's complement binary signals.

3. A digital multiplying circuit according to claim 2, wherein each of said control signal generator is an encoder suppled with a plurality of bits of said second digital signal.

4. A digital multiplying circuit according to claim 3, wherein each encoder encodes an input thereof according to Booth's algorithm.

5. A digital multiplying circuit according to claim 4, wherein each of said encoder generates the control signal with a plurality of bits in the form of a 2's complement binary signal.

6. A digital multiplying circuit according to claim 1, wherein each of said partial product signal generating circuit is a selector controlled by said control signal from the corresponding control signal generator.

7. A digital multiplying circuit according to claim 1, wherein said first delay means imparts a larger delay to the first digital signal input to the partial product signal generating circuit, the output signal of which forms a higher bit component of the product.

* * * * *